United States Patent [19]

Coetzee

[11] 4,180,106
[45] Dec. 25, 1979

[54] DEVICE FOR DISPENSING MEASURED QUANTITIES OF A LIQUID FROM A BOTTLE

[76] Inventor: John C. Coetzee, P.O. Box 66160, Broadway, 2020, South Africa

[21] Appl. No.: 939,738

[22] Filed: Sep. 5, 1978

[30] Foreign Application Priority Data

Sep. 6, 1977 [ZA] South Africa .................. 77/5345
Jul. 20, 1978 [ZA] South Africa .................. 78/4140

[51] Int. Cl.² ........................................ B65B 3/06
[52] U.S. Cl. .................................. 141/294; 141/295;
141/362; 222/365; 222/453
[58] Field of Search ............ 141/360, 361, 362, 291,
141/292, 293, 294, 295, 302, 351–359, 115;
222/365, 453

[56] References Cited

U.S. PATENT DOCUMENTS

| 2,679,347 | 5/1954 | Franz | 141/295 |
| 3,109,546 | 11/1963 | Baruh | 222/453 |

Primary Examiner—Houston S. Bell, Jr.
Attorney, Agent, or Firm—Lowe, King, Price & Becker

[57] ABSTRACT

A dispensing and metering device which can be attached to the neck of a bottle has a housing defining a chamber having an inlet and an outlet. The chamber can be filled through the inlet with liquid from a bottle secured to the device by an attachment element and can be drained through the outlet. A valve arrangement which includes an outlet nozzle extending generally away from the outlet, is movable from a first condition in which it closes the inlet and opens the outlet, through a second condition in which it closes both the inlet and the outlet, to a third condition in which it closes the outlet and opens the inlet. A flow path is defined at least partly within the valve arrangement for introducing air into the chamber via the nozzle and the outlet. The air replaces liquid flowing from the outlet when the outlet is open. The valve arrangement is resiliently biassed to the third condition to keep the outlet closed until the valve arrangement is operated.

16 Claims, 9 Drawing Figures

DEVICE FOR DISPENSING MEASURED QUANTITIES OF A LIQUID FROM A BOTTLE

This invention relates to dispensing and metering devices, and more specifically to devices for delivering measured quantities of liquids, such as spirits, from inverted bottles.

Such devices have measuring chambers, inlets and outlets, and valve means for allowing liquid to drain through their outlets when their inlets are closed and to flow into the chambers through the inlets when the outlets are closed.

One form of such a device has a valve means in the form of a rotatable tap having inlet and outlet ports for permitting liquid to flow initially into the chamber when the tap is in a first position and from the chamber when the tap is in a second position. The device also provides an air valve which is arranged to guide air from the chamber into the bottle when the tap is in its first position and to permit air to flow into the chamber from the atmosphere when the tap is in the second position. An example of a device of this type is shown in U.K. Patent specification No. 298,589.

Another more commonly used type of device has its valve means fitted with operating arms below the chamber and is operable by lifting the arms upwardly by means of a glass to be filled. Liquid can flow from the chamber when the arms are raised and the chamber can be re-filled automatically through the inlet when the arms are lowered. A separate air valve is provided in the upper part of the chamber and allows air to flow into the chamber only as the liquid leaves the outlet. The air valve is operated when the arms are raised. An arrangement including a pair of devices of this nature is shown in U.K. Patent specification No. 519,621.

In both of these devices, air flows into the chamber from the upper part of the device, requiring additional manufacturing steps in forming the chamber housing and presenting additional sealing problems. While these problems have been overcome in practice, the housings are relatively complex and the devices are relatively expensive.

U.K. Patent specification No. 476,767 discloses a device in which, when the measuring chamber is emptying, air flows into the chamber through the outlet. In this device, a tubular casing extends from the inlet to the outlet. This tubular casing is provided with an upper pair of ports through which the liquid can enter the chamber from a bottle and a lower pair of ports through which the liquid can leave the chamber. A piston-like valve member is slidable within the casing and can selectively close either the upper or lower ports to control the flow of liquid into and from the chamber. A bar is again provided for operating the valve member by means of a glass. When the liquid flows into or from the chamber, air is intended to flow from or into the chamber through the ports.

The housing of this device is complex, requiring both a glass tube and the tubular casing to be clamped and sealed between end members which are drawn together by screws extending externally of the tube. The tubular casing and valve member must be accurately dimensioned to ensure proper operation of the ports and the size of the ports must necessarily restrict the rate of flow of liquid from the chamber, particularly as air must flow through the same relatively small ports. In addition, the liquid must flow over the operating bar as it leaves the device, which is clearly undesirable.

The device of specification No. 476,767 is not suitable for use where a bottle on which it is mounted may be manipulated extensively, for example, in a home bar, and could readily spill its contents if laid on its side with its inlet ports closed.

It is an intention of the applicant to provide a device which can be manufactured simply and inexpensively without a separate air valve and which allows rapid emptying of its chamber. The applicant also aims to provide a device which can ensure positive sealing when mounted on a bottle, irrespective of its orientation.

According to the invention there is provided a dispensing and metering device comprising attachment means to secure the device to the neck of a bottle; a housing defining a chamber having an inlet and an outlet so that the chamber can be filled through the inlet with liquid from a bottle secured to the device by the attachment means and can be drained through the outlet; valve means including an outlet nozzle extending generally away from the outlet, the valve means being movable from a first condition in which it closes the inlet and opens the outlet, through a second condition in which it closes both the inlet and the outlet, to a third condition in which it closes the outlet and opens the inlet; and a flow path defined at least partly within the valve means for introducing air into the chamber via the nozzle and the outlet to replace liquid flowing from the outlet when the outlet is open, the valve means being resiliently biassed to the third condition.

The attachment means may be part of an element, such as an insert, fitted to an open end of a housing member so that the element and housing member define the housing. The housing can thus consist of only two parts. This also enables the housing member and valve means to be of a standard construction for a wide range of bottles. Only the element needs to be changed to suit the different bottle necks. The element is a relatively simple part and simply changing the elements for different bottles does not significantly complicate manufacture of the devices. If the element is an insert, locating means, such as a locating shoulder, may be provided in the housing member for locating the insert accurately with respect to the housing member so that the chamber has a predetermined volume. The volume of the valve means within the chamber may be selected so that the total volume within the chamber available for receiving liquid is itself of a predetermined volume, for example the volume of a standard tot.

The inlet may be defined by a plurality of non-circular openings in the housing, for example in the insert. It has been found that a number of suitable non-circular openings, such as key-hole shaped openings, can be arranged in a ring to permit relatively rapid flow of the liquid into the device while enabling a guide for the valve means to be encircled by the ring. An inlet valve seat may be formed adjacent to the inlet. This seat may comprise a cylindrical socket and additionally or alternatively a substantially frusto-conical inner wall surface in the housing. The valve means may then include a closure member guided towards the inlet seat by the guide for engaging the inlet seat to close the inlet. A spring may be provided for biassing the valve means to the condition in which the inlet is open and the outlet is closed.

The outlet may comprise a single opening from the chamber and a frusto-conical outlet valve seat may be provided by a wall of the housing extending away from the outlet. The valve means may then have a valve body with a complementary valve surface and optionally including an O-ring seal for engaging the outlet seat to close the outlet. A further valve surface which is also complementary to the valve seat may also be provided on the closure member to form a double seal for the outlet. The provision of valve surfaces and a valve seat of this nature allow a relatively tight seal to be achieved, particularly with moulded plastics components, even when the device is inverted from the position shown.

While it may be possible to produce a device which functions in a suitable manner with the outlet seat substantially at right angles to the axis of the housing member, it has been found, in experimental tests, that the outlet seat should preferably be at an angle of not more than 60 degrees and more preferably at 45 degrees or less to the axis of the housing member. This can permit rapid and efficient flow from the housing with good seating characteristics.

The closure member may be movable with respect to the valve body so that at least the closure member may initially be moved until it closes the inlet and so that the valve body may thereafter move with respect to the closure member, for example by compressing a spring which normally holds the closure member and valve body in a predetermined position with respect to one another. The valve body may normally keep the outlet substantially closed until the inlet is completely closed; thus preventing premature dispensing of liquid. The spring acting between the closure member and the valve body can allow the necessary lost motion to ensure that the inlet is always closed before the outlet is significantly opened.

The outlet nozzle may be guided by a throat extending away from the outlet. For example, it may be formed at least partly by a cap including a sleeve fitting over and guided by the throat. A press bar may extend from opposite sides of the cap for engagement by a glass to raise the cap, and thus the valve body and closure member, to close the inlet and open the outlet to and from the chamber. The nozzle guides liquid from the outlet and prevents it from flowing onto the press bar.

A connecting tube partly encircled by a liquid path through which liquid can flow from the outlet may be open at or below the level of the press bar and may communicate with air bleed openings passing through or adjacent to the valve body for introducing air through the nozzle and outlet into the chamber so that the air can replace liquid flowing from the chamber when the chamber is drained. Alternatively, a suitable nozzle insert may extend within the cap and may define a central tube through which the liquid will primarily flow and angularly spaced holes of suitable dimensions within which the air will mainly flow. Air and liquid can pass each other in this nozzle insert to allow air to enter the housing through the holes as liquid flows through the central tube. A spider arrangement fixed to the cap may be used to operate the valve body and closure member when the cap is moved.

Because of the way in which the device is made, the housing can be readily adapted to have a shape similar to that of a bottle to which the device is to be attached. The device may be provided with a label which, although smaller, may correspond in design to that on the bottle to which the device is to be attached. In order to prevent damage to the label, the label may be covered by plastics shrink wrap material or other suitable transparent material. The cap may, as far as possible, be designed to simulate a bottle cap. Advertising material may be included on the press bar, if desired.

The parts of the device may be made of any suitable material but, where practical, are preferably formed from suitable moulded plastics materials. This can enable a bracket for mounting the device to be formed integrally with the housing member and can also enable a seal arrangement to be formed integrally with the housing member or with the insert. The use of moulded plastics material for most of the components of the device can make it possible for the device to be relatively cheap. It can be fixed on a bottle when the bottle is sold in a normal manner through retail outlets. This is not feasible with comparable metering devices known to the applicant as they are several times more expensive to produce.

An embodiment of the invention will now be described, by way of example, with reference to the accompanying drawings, in which.

Figure 1:
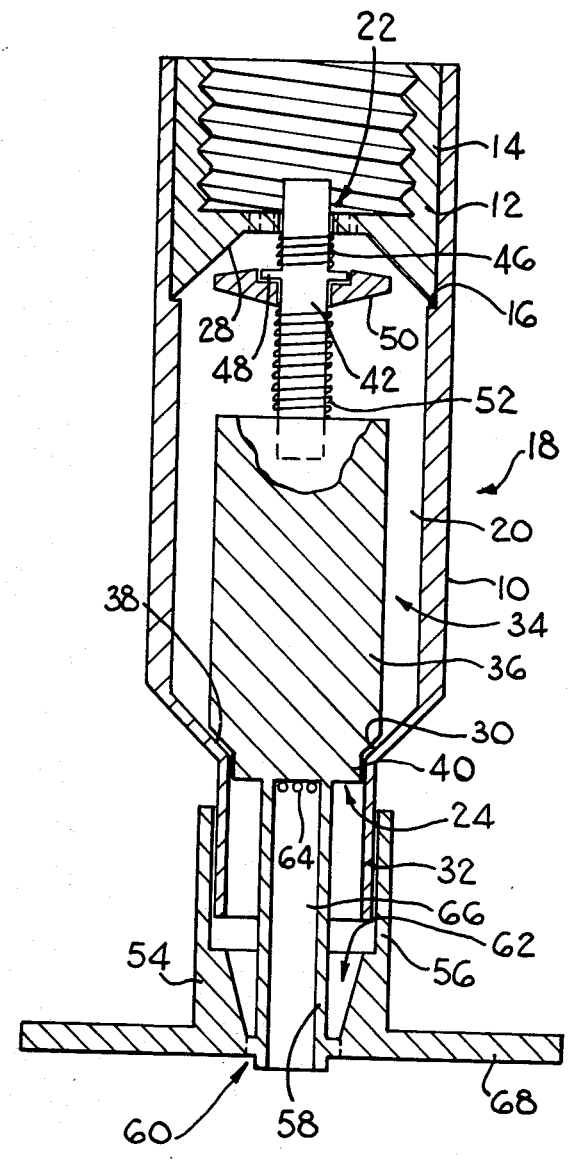
FIG. 1 is a partial cross-section through a dispensing and metering device.
Figure 2:
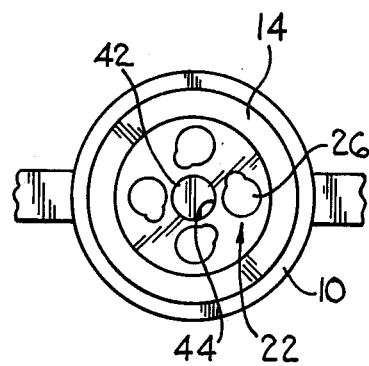
FIG. 2 is a plan view of the device.
Figure 3:
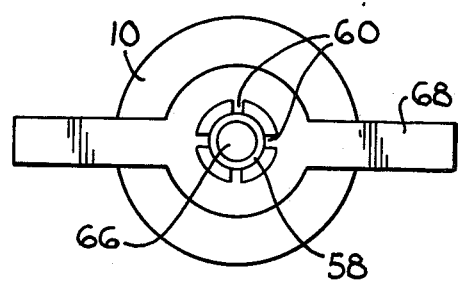
FIG. 3 is an underplan view of the device.

The device shown in FIGS. 1 to 3 comprises a tubular housing member 10 which has one end partially closed by an insert 12. The insert 12 is bonded in place and defines attachment means 14 which is internally threaded for screwing onto the neck of a bottle. However, because the insert is simply fitted and bonded within the housing member 10, inserts with other forms of attachment means can be readily inserted during manufacture for fitting on bottles with different types of neck formations. The insert is accurately located in position in the housing member by a locating shoulder 16 on the housing.

As shown in FIG. 1, the housing member and insert together form a housing 18 defining a chamber 20. The chamber has an inlet 22 and an outlet 24 so that the chamber can be filled through the inlet with liquid from a bottle secured to the device by the attachment means 14 and can be drained through the outlet. The inlet is formed by a plurality of non-circular openings 26 which permit rapid flow of liquid from a bottle into the chamber while allowing air to flow from the chamber. On the other hand, the outlet is formed by a single opening at the opposite end of the chamber.

The insert 12 of FIG. 1 has an inner frustro-conical wall defining an inlet valve seat 28 diverging away from the inlet 22 and the housing member 10 has a frusto-conical wall defining an outlet valve seat 30 diverging away from the outlet 24. A throat 32 formed by a part of the housing member extends away from the outlet 24 in the opposite direction to the outlet seat 30.

The device also includes valve means 34 movable between a first condition in which it closes the inlet and opens the outlet and a second condition in which it closes the outlet and opens the inlet. The valve means comprises a valve body 36 having a complementary valve surface 38 for seating snugly against the outlet seat 30 to close the outlet 24. The valve body also has a spigot 40 which extends partially into the outlet and into the throat 24. A stem 42 extends from the opposite end of the valve body to the spigot 40 and passes through a guide opening 44 in the insert 12. A spring 46 is located about the stem 42 and acts against the insert 12 and against a spring seat 48 on the stem to bias the stem and thus the valve body towards the outlet seat 30.

A closure element 50 of the valve means 34 fits slidably on the stem 42, the clearance between the closure member 50 and the stem being as small as possible while allowing sliding movement of the closure member of the stem. A spring 52 acts between the valve body 36 and the closure member 50 and biasses the closure member against the opposite end of the spring seat 48 to the spring 46.

A cap 54 also forms part of the valve means. The cap has a sleeve 56 fitting slidably over the throat 32 and is guided for movement by the throat 32. The cap is attached to a connection tube 58 by a spider arrangement 60 comprising a plurality of webs spaced around the connecting tube while leaving openings between the cap and the connecting tube. The cap defines an outlet nozzle 62 extending from the outlet 24.

The connecting tube 58 extends upwardly from the spider 60 and is formed integrally with the valve body 36. Air bleed openings 64 are formed in the connecting tube adjacent to the valve body 36 and the tube and openings thus form an air flow path 66 from a location slightly below the cap to a location adjacent to the valve body 36. A press bar 68 extends from opposite sides of the cap 54 and can be engaged by a glass for lifting the cap and thus the connecting tube, valve body and closure member.

In operation, the device is attached to a bottle by the attachment means 14 and the bottle and device are suspended with the bottle neck pointing downwardly. The inlet 22 is, at this time, open and the outlet 24 is closed. Liquid thus flows from the bottle into the chamber 20 until the chamber is full. When the liquid is to be dispensed, a glass is placed below the press bar 68 and is raised to lift the press bar, connecting tube, valve body and closure member. The closure member thus moves to strike the inlet seat 28 and close the inlet 22. At the instant that the inlet is closed, the spigot 40 is still within the outlet 24 and throat 32 and therefore prevents significant flow of liquid from the chamber 20. However, further lifting of the press bar causes the stem 42 to move with respect to the closure member, compressing the spring 52, and the valve body 36 thus moves upwardly towards the closure member so that the spigot moves sufficiently far upwards to open the outlet and allow liquid to flow through the oulet 24 and then through the outlet nozzle 62 into the glass. At this time, air flows along the air flow path 66 and into the chamber to replace liquid that leaves the chamber, thus permitting relatively rapid emptying of the chamber.

The volume of the chamber and the volume of the parts within the chamber are selected so that the volume of liquid dispensed is equal, for example, to one tot.

Once the liquid has been dispensed, the press bar 68 is released, closing the outlet 24 and again opening the inlet 22. The chamber again fills with liquid.

The device in FIGS. 4 to 7 also comprises a tubular housing member 10 which has one end partially closed by an insert 12. The insert 12 defines attachment means 14 as in FIG. 1. The insert is accurately located in position in the housing member 10 against two locating shoulders 16 on the housing, and the housing member and insert again form a housing 18 defining a chamber 20.

The chamber has an inlet 22 and an outlet 24 as in FIG. 1, so that the chamber can be filled through the inlet with liquid from a bottle secured to the device by the attachment means 14 and can be drained through the outlet. The inlet is formed by a plurality of noncircular openings 26 as in FIG. 1.

Figure 4:
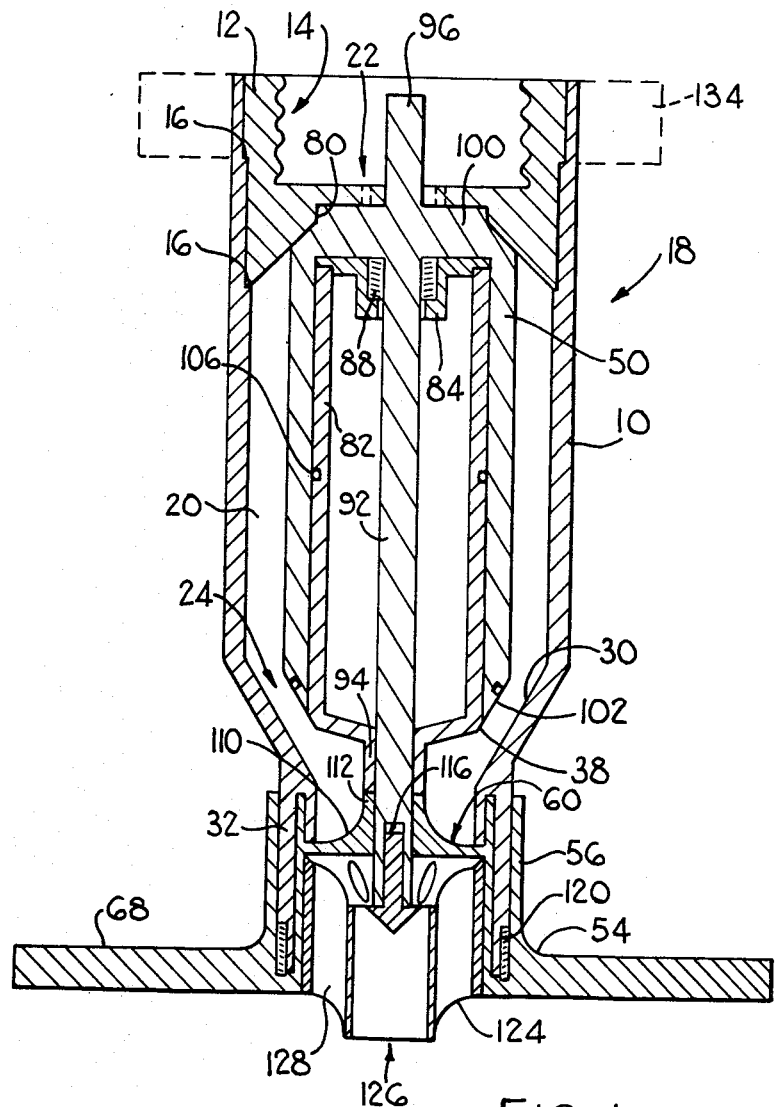
FIGS. 4 to 6 are partial cross-sections through a further dispensing device, showing three operating stages.

In contrast to FIG. 1, the insert 12 of FIG. 4 has an inner frusto-conical wall terminating in a socket 80 the wall and socket together defining an inlet valve seat 28 adjacent the inlet 22. However, as in FIG. 1, the housing member 10 of FIG. 4 has a frusto-conical wall defining an outlet valve seat 30 diverging away from the outlet 24. A throat 32 formed by a part of the housing member extends away from the outlet 24 in the opposite direction to the outlet seat 30.

The valve means 34 is movable between a first condition (FIG. 4) in which it closes the inlet 22 and opens the outlet 24, through a second condition (FIG. 5) in which the inlet and outlet are both closed, to a third condition (FIG. 6) in which it closes the outlet and opens the inlet.

The valve means of FIG. 4 comprises a hollow valve body 36 having a complementary valve surface 38 including an Oring seal for seating snugly against the outlet seat 30 to close the outlet 24. A cylindrical portion 82 of the valve body 36 is received snugly but slidably within a cavity in the closure element 50 of FIG. 4. A spring cap 84 defining a spring seat 86 receives a spring 88 which acts against the inner surface 90 of the element 50 and biasses the valve body 36 to move from the cavity in the closure element.

An inner stem 92 extends axially through the centre of the cavity in the element 50 and passes through a tubular portion 94 of the valve body 36. An outer stem 96 extends from the outside of the closure element 50 and passes through a guide opening 44 in the insert 14.

The closure element 50 in FIG. 4 has a frusto-conical surface 98 for engaging the inner frusto-conical wall of the insert 14, and has a cylindrical closure head 100 for fitting in the socket 80 to ensure satisfactory closing of the inlet 22. At its opposite end, the closure member has a part-conical surface 102 for engaging the outlet seat 30. The seat 30 and surface 102 are at an angle of about 30 degrees to the axis of the stem 92 to ensure satisfactory sealing of the device. However, an Oring seal 104 is provided in a groove in the surface to further enhance the sealing of the outlet 24.

The cavity within the closure element 50 is filled with air and is sealed by the valve body 36. In order to avoid ingress of liquid into the cavity, an O-ring seal 106 may be provided if necessary.

As in FIG. 1, a cap 54 forms part of the valve means in FIG. 4. The cap has an outer sleeve 56 fitting slidably over the throat 32 and an inner sleeve 108 fitting slidably within the throat. The cap is thus guided by the throat. A spider arrangement 60, which extends inwardly from the inner sleeve 108, comprises a plurality of spaced webs 110 fixed to a central spider tube 112. The spider tube slidably receives the stem 92.

A stud 114 is adhesively bonded in an opening 116 in the end of the stem 92 and has an enlarged head 118 trapping the spider tube 112 on the stem. A spring 120 is located in a spring housing between the sleeves 56 and 108 and acts against the cap and a shoulder 122 on the housing member 10 to bias the spider tube 112 against the head 118 of the stud 114.

Figure 7:
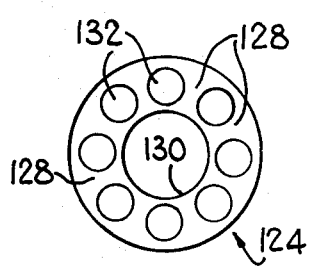
FIG. 7 is an underplan view of a nozzle insert of FIGS. 4 to 6.

A nozzle insert 124 is bonded within the cap 54 and serves with the cap to define a nozzle 126. The insert 124 includes inwardly extending ribs 128 carrying a central, substantially cylindrical, liquid tube 130 and separating angularly spaced holes 132 (FIG. 7).

A press bar 68 extends from the cap and can be engaged by a glass to lift the cap.

Figure 5:
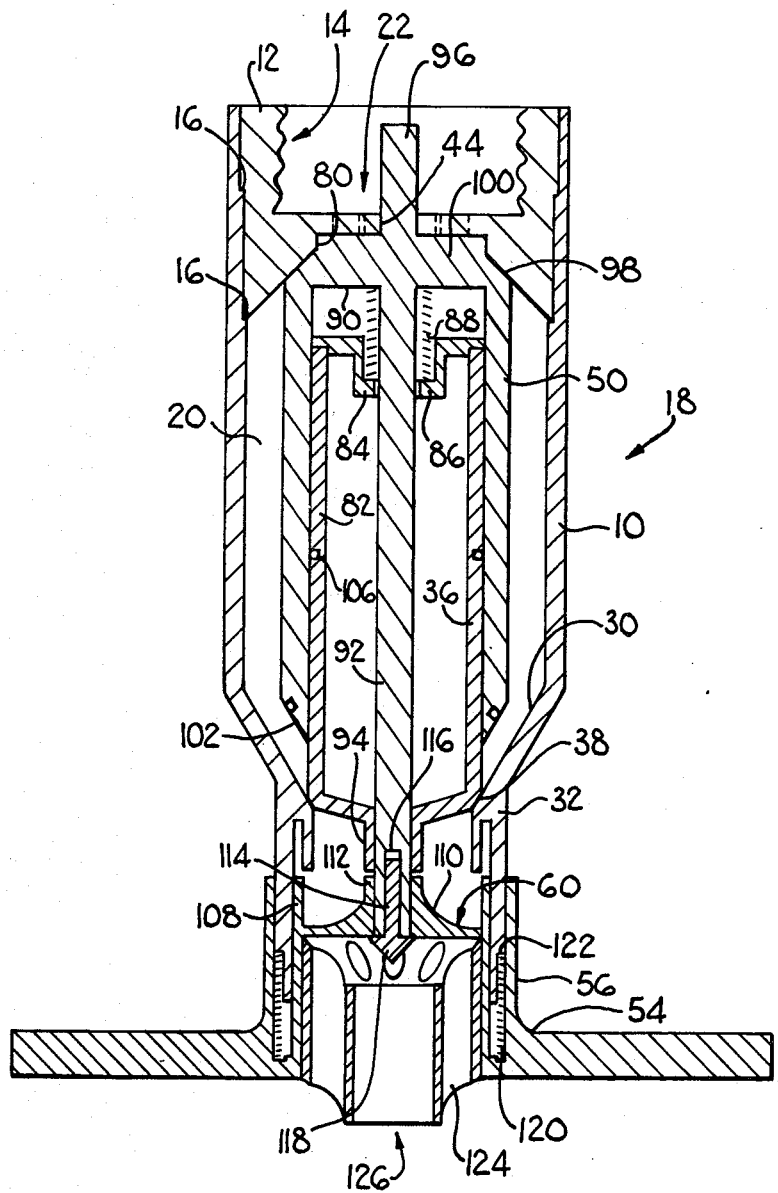
Figure 6:
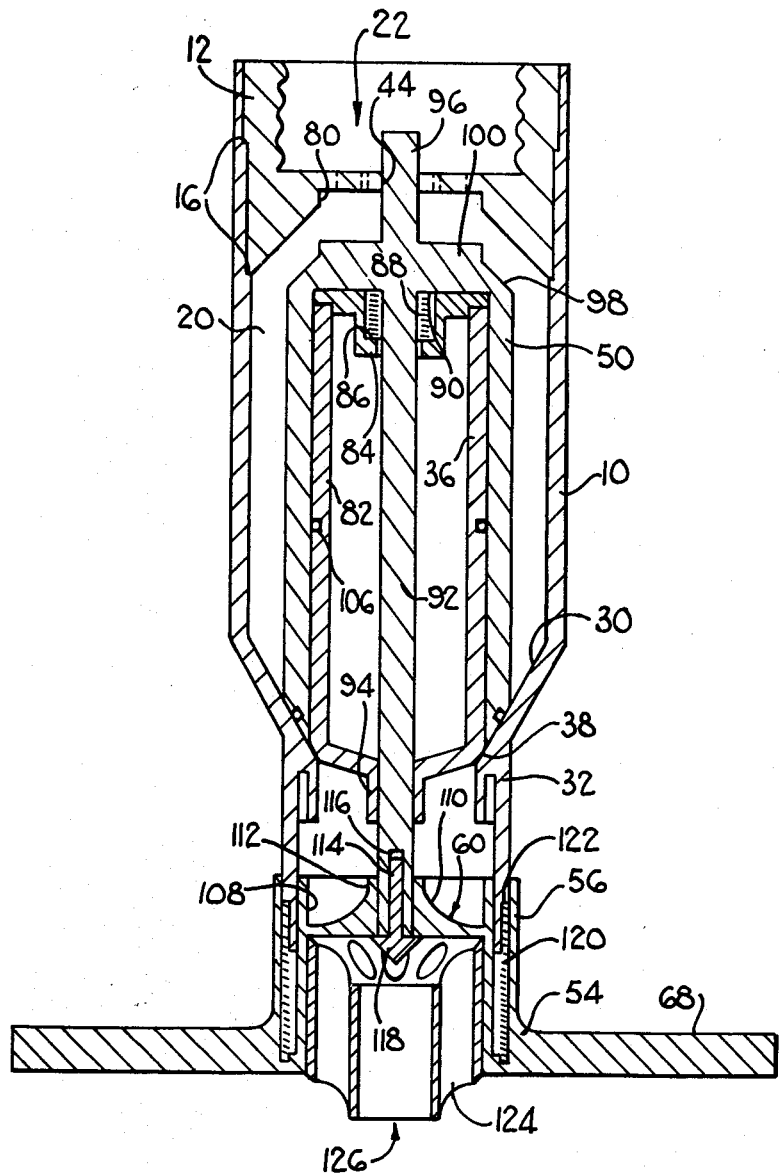

In operation, the device of FIG. 4 is attached to a bottle by the attachment means 12 and the bottle and device are suspended with the bottle neck pointing downwardly as with the device of FIG. 1. In FIG. 6, the inlet 22 is open and the outlet 24 is closed so that liquid flows from the bottle into the chamber 20 until the chamber is full. When the liquid is to be dispensed, a glass is placed below the press bar 68 and is raised to lift the press bar and cap against the action of spring 120. Initially the closure member is moved by the spring 88 towards the inlet seat 28 and closes the inlet 22 while the spring 88 holds the surface 38 against outlet seat 30. At the instant that the inlet is closed, the outlet 24 is still closed by the valve body 36, which prevents significant flow of liquid from the chamber 20 (FIG. 5). However, further lifting of the press bar causes the spider tube 112 to engage the valve body 36 and to move it with respect to the closure member, compressing the spring 88. The valve body 36 thus moves upwardly towards the closure member to form an annular space between the surface 38 and seat 30 and allow liquid to flow through the outlet 24 and then primarily through the tube 130 of the outlet nozzle 126 into the glass (FIG. 4). At this time, air flows mainly through the holes 132 within the nozzle, through the spider and into the chamber to replace liquid that leaves the chamber, thus permitting relatively rapid emptying of the chamber.

Release of the bar 68 permits the valve means to return to the position shown in FIG. 4, in which case a double seal is formed against the outlet seat 30 to prevent accidental leakage from the chamber, this double seal being provided by the engagement of the surfaces of both the valve body and the closure member with the seat.

Figure 8:
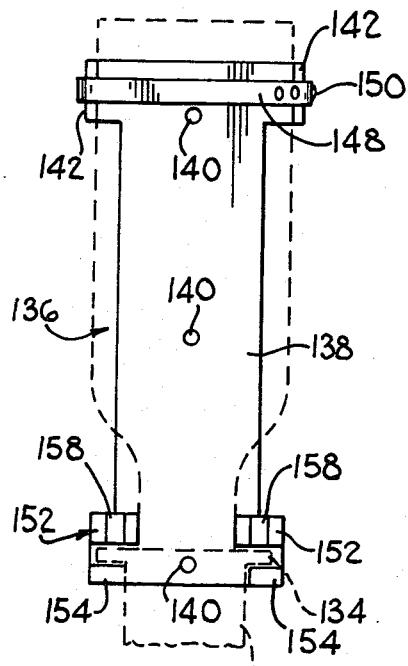
FIGS. 8 and 9 are front and plan views of a wall bracket.
Figure 9:
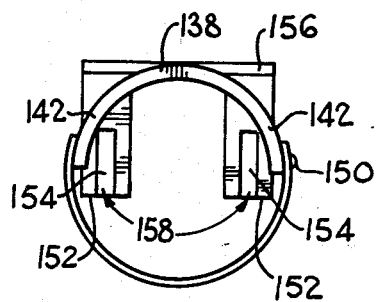

Mounting brackets 134 (shown in chain lines in FIG. 4) may be formed integrally with the housing. These brackets comprise rectangular cross-section lugs projecting from the housing and can be used to locate the device in a wall bracket 136 shown in FIGS. 8 and 9.

The wall bracket is formed of plastics material and comprises an upright 138 containing screw holes 140 for receiving screws to attach the bracket 136 to a wall. A pair of curved arms 142 extend from the upper part of the upright 138 for partially embracing a bottle shown in chain lines at 144. A strap 146 is fixed to one of the arms and contains holes 148 for receiving a mushroom-shaped stud 150 on the other arm 142. However, any suitable type of clip or buckle may be used. The strap holes the upper part of the bottle 144 in place.

The lower part of the bottle 144 is received in the attachment means of a device similar to that shown in FIG. 4 with mounting brackets 134. The device is partly shown in chain lines in FIG. 8.

The brackets 134 of the device are a force fit between upper and lowr pairs of arms 152 and 154 spaced along the height of the upright 138. These arms project from a lower part 156 of upright 138. The lower arms 154 are suitably spaces so that the housing member 10 of the device is a force fit between them. The upper arms are both bifurcated at 158 to allow greater resilient deformation and can receive the neck of the bottle between them. The lower part of the bottle can thus be located relatively simply by means of the wall bracket 136 and mounting brackets 134.

I claim:

1. A dispensing and metering device comprising attachment means for securing the device to the neck of a bottle;

a housing defining a chamber;

an inlet into said chamber adjacent said attachment means whereby the chamber can be filled through the inlet with liquid from a bottle secured to the device by the attachment means;

an outlet from the chamber whereby the chamber can be drained through the outlet;

valve means including first sealing means, second sealing means and an outlet nozzle means extending generally away from the outlet towards a bottom end furthest from the outlet and movable to control operation of said first and second sealing means;

the valve means being movable from a first condition in which said first sealing means closes the inlet and the outlet is open, through a second condition in which said first sealing means closes the inlet and the second sealing means closes the outlet, to a third condition in which at least said second sealing means closes the outlet and the inlet is open;

a liquid flow path defined at least partly by said outlet nozzle means through which path liquid from said chamber will primarily flow;

an air flow path defined at least partly within the outlet nozzle means and opening towards the bottom end of said outlet nozzle means for introducing air into the chamber via the outlet nozzle means and the outlet to replace liquid flowing from the outlet through the liquid flow path when the outlet is open; and resilient means disposed within said housing and biasing the valve means resiliently to the third condition.

2. The device of claim 1, wherein said housing comprises a housing member and an element fitted to an open end of the housing member, a locating shoulder being provided by the housing member for locating the element accurately with respect to the housing member during assembly of the device so that the chamber has a predetermined volume.

3. The device of claim 2, wherein the inlet is defined by a plurality of non-circular openings in the housing, the openings being arranged in a ring to permit flow of liquid into the device and a guide for the valve means being encircled by the ring.

4. The device of claim 1, wherein said housing has an inner wall surface defining a frusto-conical outlet valve seat extending away from the outlet and said second sealing means comprises a valve body for engaging the outlet seat to form a seal closing the outlet.

5. The device of claim 4, wherein said housing has an inner wall surface defining an inlet valve seat adjacent to the inlet and said first sealing means comprises a closure member guided towards the inlet seat for engaging the inlet seat to form a seal closing the inlet.

6. The device of claim 5, wherein said closure means has a valve surface which is complementary to the outlet valve seat for engaging said outlet valve seat to form a further seal for the outlet.

7. The device of claim 4, wherein said valve body is movable along an axis and the outlet seat is at an angle of not more than 60 degrees to said axis.

8. The device of claim 6, wherein said valve body and closure member are movable along an axis and the outlet seat is at an angle of not more than 45 degrees to said axis.

9. The device of claim 5, wherein the closure member is movable with respect to the valve body so that at least the closure member can initially be moved until it closes the inlet, wherein a spring acts between the closure member and the valve body to allow limited necessary lost motion to ensure that the inlet is closed before the outlet is opened and permit the valve body thereafter to move with respect to the closure member, the valve body keeping the outlet closed until the inlet is completely closed.

10. The device of claim 1, wherein a throat extends away from said outlet and the outlet nozzle means is formed at least partly up a cap including a sleeve fitting over and guided by the throat, and wherein a press bar extends from opposite sides of the cap for engagement by a glass to raise the cap and operate the valve means.

11. The device of claim 10, wherein a connecting tube partly encircled by the liquid flow path through which liquid can flow from the outlet is open at or below the level of the press bar, and wherein air bleed openings communicate with said tube adjacent to the valve body to form said air flow path.

12. The device of claim 10, wherein a suitable nozzle insert extends within the cap and defines a central tube forming the liquid flow path through which liquid will primarily flow and openings formed in said central tube for defining the air flow path within which are will mainly flow.

13. The device according to claim 1, wherein said housing has an overall shape similar to that of a bottle, bracket means for mounting the device being formed integrally with said housing adjacent to said attachment means.

14. A dispensing and metering device comprising attachment means to secure the device to the neck of a bottle; a housing defining a chamber having an inlet and an outlet so that the chamber can be filled through the inlet with liquid from a bottle secured to the device by the attachment means and can be drained through the outlet; an outlet valve seat provided by a wall of the housing adjacent to said outlet; an inlet valve seat formed by a wall of the housing adjacent to said inlet; and valve means movable from a first condition in which it closes the inlet and opens the outlet, through a second condition in which it closes both the inlet and the outlet, to a third condition in which it closes the outlet and opens the inlet; said valve means comprising:

a valve body for engaging the outlet valve seat for closing the outlet when said valve means is in said second and third conditions;

a closure member for engaging the inlet valve seat to form a seal closing the inlet when said valve means is in said first and second conditions;

closure means on said closure member for engaging the outlet valve seat for additionally closing the outlet when said valve means is in said third condition, the closure member being movable with respect to the valve body for permitting said closure member to be moved away from said outlet valve seat independently of said valve body until said closure member closes said inlet;

a secondary spring acting between said closure member and said valve body for inducing limited lost motion between said valve body and closure member by permitting said closure member to close said inlet while said secondary spring biasses said valve body against said outlet valve seat;

a primary spring biassing said closure member towards said outlet valve seat; and an outlet nozzle extending generally away from the outlet and movable to control operation of said valve body and closure member, said nozzle defining a liquid flow passage through which liquid from said outlet will primarily flow and further defining at least part of an air flow path whereby air can flow towards said chamber through said air flow path as liquid flows through said liquid flow passage.

15. The device of claim 14, wherein the housing comprises an element fitted to an open end of a housing member so that the element and housing member define the chamber; the element being an insert bonded in the housing member, and the housing member having a locating shoulder for locating the insert accurately with respect to the housing member during assembly of the device.

16. The device of claim 14, wherein the outlet nozzle is formed at least partly by a cap, wherein a throat extending away from the outlet is received within and guides said cap, and wherein a press bar extends from opposite sides of the cap for engagement by a galss to raise the cap and operate the valve means.

* * * * *